United States Patent [19]

Riggs

[11] Patent Number: 4,775,179
[45] Date of Patent: Oct. 4, 1988

[54] AERODYNAMICALLY CONTOURED SLEEPER APPARATUS

[75] Inventor: Tony M. Riggs, Joplin, Mo.
[73] Assignee: Able Body Corporation, Joplin, Mo.
[21] Appl. No.: 948,079
[22] Filed: Dec. 31, 1986
[51] Int. Cl.⁴ .................. B62D 35/00; B62D 33/06
[52] U.S. Cl. ........................... 296/180.2; 296/69; 296/190; 296/208; 5/118
[58] Field of Search ............... 296/1 S, 24 R, 69, 166, 296/170, 190, 208; 5/17, 18 R, 118; 49/488

[56] References Cited

U.S. PATENT DOCUMENTS

| | | | |
|---|---|---|---|
| D. 238,161 | 12/1975 | De Vaughn | D12/181 |
| D. 252,508 | 7/1979 | Wiley, Jr. | D12/181 |
| D. 252,619 | 8/1979 | Wiley, Jr. | D12/181 |
| D. 252,620 | 8/1979 | Wiley, Jr. | D12/181 |
| D. 252,621 | 8/1979 | Wiley, Jr. | D12/181 |
| D. 252,622 | 8/1979 | Wiley, Jr. | D12/181 |
| D. 252,623 | 8/1979 | Wiley, Jr. | D12/181 |
| D. 263,040 | 2/1982 | Fitzgerald et al. | D12/181 |
| D. 268,021 | 2/1983 | Wiley, Jr. | D12/181 |
| D. 287,114 | 12/1986 | Herpel | D12/181 |
| 2,514,695 | 7/1950 | Dempsey | 296/1 S X |
| 3,415,566 | 12/1968 | Kerrigan | 296/1 S |
| 3,558,180 | 1/1971 | Algire | 296/174 |
| 3,596,974 | 8/1971 | Adams | 296/1 S |
| 3,637,251 | 1/1972 | Plant, Jr. | 296/166 |
| 3,711,146 | 1/1973 | Madzsar et al. | 296/1 S |
| 3,822,910 | 7/1974 | Wiley, Jr. | 296/1 S |
| 3,834,752 | 9/1974 | Cook et al. | 296/1 S |
| 3,945,677 | 3/1976 | Servais et al. | 296/1 S |
| 4,029,353 | 6/1977 | Bargnyi et al. | 49/488 X |
| 4,035,013 | 7/1977 | Abbott, III | 296/1 S |
| 4,121,684 | 10/1978 | Stephens et al. | 180/89.14 |
| 4,142,755 | 3/1979 | Keedy | 296/1 S |
| 4,201,415 | 5/1980 | Suchanek | 296/190 |
| 4,245,862 | 1/1981 | Buckley, Jr. | 296/1 S |
| 4,257,640 | 3/1981 | Wiley | 296/1 S |
| 4,257,643 | 3/1981 | Choulet | 296/1 S |
| 4,290,639 | 9/1981 | Herpel | 296/1 S |
| 4,311,334 | 1/1982 | Jenkins | 296/1 S |
| 4,319,778 | 3/1982 | Leonard | 296/166 |
| 4,343,506 | 8/1982 | Saltzman | 296/1 S |
| 4,351,554 | 9/1982 | Miller | 296/24 R |
| 4,397,496 | 8/1983 | Drygas, III | 296/1 S |
| 4,440,433 | 4/1984 | Williams et al. | 296/91 X |
| 4,458,937 | 7/1984 | Beckmann et al. | 296/1 S |
| 4,509,786 | 4/1985 | Gregg | 296/1 S |
| 4,518,188 | 5/1985 | Witten | 296/1 S |
| 4,685,715 | 8/1987 | Hardin | 296/1 S |

FOREIGN PATENT DOCUMENTS

| | | | |
|---|---|---|---|
| 2808209 | 8/1979 | Fed. Rep. of Germany | 296/1 S |
| 2838150 | 3/1980 | Fed. Rep. of Germany | 296/1 S |
| 3032042 | 4/1982 | Fed. Rep. of Germany | 296/1 S |

OTHER PUBLICATIONS

Ward's Auto World, vol. 19, No. 8, Aug. 1983, p. 26e, Photos of White Trucks, copy on Class 296, Sub Class 1 S.
Ward's Auto World, May 1984, p. 38h, Article on Penske Modified Tractor/Trailer.
Automotive News, Apr. 14, 1986, p. E20, Photo of Nissan ATP-11 Truck.

*Primary Examiner*—Dennis H. Pedder
*Attorney, Agent, or Firm*—Kerkam, Stowell, Kondracki & Clarke

[57] ABSTRACT

Aerodynamically configured sleeper apparatus comprises a sleeper base compartment adapted to be removably mounted behind the truck cab of a tractor-trailer, and an aerodynamically contoured sleeper top mounted on the sleeper base compartment. The top has a front portion which extends forwardly to overhang a portion of the cab roof, and has a height at a rear wall thereof such that the overall height of the sleeper base compartment and the top matches the height of the trailer. Transition panels, configured to match the belt line of the cab, extend forwardly to the truck cab from the front wall of the sleeper compartment to afford a smooth air flow and to give the sleeper apparatus a built-in appearance. Adjustable side fairings, connected to a rear wall of the sleeper apparatus enable its width to be varied to match trailers having different widths. An adjustable top trim tab on the sleeper top enables the height of the sleeper apparatus to be adjusted to accommodate trailers of different heights. The interior of the sleeper top is open to the interior of the sleeper base compartment to afford greater head room, and the rear wall of the top has a reverse cutout for conveying air flow upwardly over the sleeper top.

18 Claims, 5 Drawing Sheets

AERODYNAMICALLY CONTOURED SLEEPER APPARATUS

BACKGROUND OF THE INVENTION

This invention relates generally to sleeper compartments of the type used on over-the-road trucks, such as tractor-trailers and the like, and more particularly to sleepers which are aerodynamically contoured to minimize wind resistance and drag.

It is common to provide sleeping compartments on over-the-road trucks, such as tractor-trailer trucks and the like. The sleeping compartment generally provides one, and sometimes two, sleeping bunks for the truck operators, and may include storage areas for luggage, tools, and the like, as well as convenience items such as a small refrigerator. Sometimes, the sleeper compartment is built-in integrally with the truck cab, but usually it comprises a separate unit. Known sleeper units are generally squared-off box-like structures which are mounted on the truck chassis behind the truck cab. Access into the sleeper may be provided by a passageway through the rear wall of the truck cab and the front wall of the sleeper. Typically, the front wall of the sleeper is a flat transversely extending surface which projects laterally beyond the sides of the cab, and may project upwardly above the roof of the cab. The projecting portions of the front wall thus may have substantial wind resistance and may create substantial drag.

It is well known that wind resistance and drag reduce fuel efficiency and increases operating costs. With tractor-trailer trucks, the wind resistance and the resulting drag presented by the front wall of the trailer, particularly that portion which extends above the roof of the cab, may be substantial, and it is known that by reducing this drag significant improvements in operating efficiency and fuel economy may be obtained. Accordingly, various techniques and devices have been employed for streamlining truck cabs and/or trailers to reduce their wind resistance and to afford a smooth air flow over their surfaces.

It has been proposed, for example, to shape aerodynamically the body of a truck cab and/or a trailer so as to minimize their wind resistance. While this technique is capable of substantially minimizing wind resistance and drag, it has the disadavantages of being expensive and impractical in many cases. Another approach which has become quite common is to attach air fairings to the truck cab for deflecting the air flow around or over the trailer. Typically, such air fairings comprise an air deflecting member attached to the roof of the truck cab and arranged to slope upwardly toward the rear so as to direct the air flow upwardly over the top of the front wall of the trailer and, to some extent, outwardly around the sides of the front wall near the top. Although such devices are helpful in reducing the wind resistance of the trailer, they are not entirely satisfactory. They do little, for example, to reduce the wind resistance of the portion of the trailer below the level of the cab roof. Moreover, there is often a substantial distance between the trailing edge of the air fairing (and the rear of the cab) and the front wall of the trailer which allows the air leaving the fairing to "swirl" and creates turbulent air flow. Thus, the air fairing may be only partially effective in reducing the wind resistance and drag of the trailer.

Very little has been done to address the problem of minimizing the wind resistance and drag of a sleeper unit attached to a truck. For vehicles having an integral built-in sleeper, this may not be a problem since the sleeper is typically formed as a rearward extension of the cab body, and it may not present any transversely extending surfaces which would resist the air flow past the cab body. With removable sleepers, however, the situation is different. Truck cabs vary widely in size and shape, and it has not been feasible or cost effective to produce a variety of different sleepers to match the different truck cabs. Removable sleepers are typically constructed in standard sizes so that they may be used with a number of different truck cabs. Such sleepers normally extend somewhat beyond the lateral sidewalls of the cab, and these extending portions may present substantial wind resistance and drag. Other than sizing sleepers to match generally the width of truck cabs and minimize the amount by which the sleepers project beyond the sidewalls of the cab, very little consideration has been given to the aerodynamic performance of the sleepers.

It is desirable to provide removable sleeper apparatus which avoid the foregoing and other disadvantages of known sleepers, and it is to this end that the present invention is directed.

SUMMARY OF THE INVENTION

The invention affords an aerodynamically contoured sleeper apparatus which may be removably installed on a truck chassis behind the truck cab so as to have an integral built-in appearance. The contour of the sleeper apparatus is such as to afford an attached air flow which conveys the air smoothly rearwardly over the sleeper apparatus so as to substantially reduce the wind resistance and drag of both the sleeper apparatus and of a trailer pulled by said truck.

Briefly stated, in one aspect, the invention affords sleeper apparatus which comprises a sleeper base compartment and a sleeper top installed on the base compartment. The base compartment, which comprises an enclosure, has a front wall with a smaller width than that of the rear wall of the enclosure, and the side walls are extended outwardly to the rear to impart a front-to-backwedge shape to the enclosure. The sleeper top comprises a rigid hollow shell which is aerodynamically contoured so as to impart to the top an aerodynamically efficient shape which reduces wind resistance and drag. The top has a height such that it extends above the height of the cab roof, and has a front portion which extends forwardly of the front wall of the enclosure so as to overhang the cab roof and to be spaced therefrom.

In another aspect, the invention affords sleeper apparatus comprising a base compartment and a sleeper top installed on the base compartment which has a front portion which overhangs the roof of the truck cab and is spaced therefrom. The top is aerodynamically contoured so that it constitutes an air fairing which reduces wind resistance and drag. Transition panels extend forwardly from the front wall of the sleeper base compartment to the side walls of the cab, the transition panels having a leading edge shaped to match the shape and the size of the truck cab so that the transition panels blend into the sides of the truck cab. The panels are contoured so as to provide a smoothly curved surface from the sides of the truck cab to the sides of the sleeper base compartment to afford a smooth air flow thereover.

In accordance with more specific aspects of the invention, adjustable side fairings may be pivotally connected to a rear wall of the sleeper enclosure adjacent to its side walls, and means may be connected to the side fairings and to the rear wall so as to enable the side fairings to be positioned at a predetermined angle relative to the side walls for matching the width of a trailer pulled by the truck. In addition, a laterally extending adjustable height tab may be pivotally connected along a leading edge thereof to an upper surface of the sleeper top adjacent to a rear wall of the top so as to enable the height tab to be angled upwardly to the rear relative to the upper surface of the top so that the height of the top at its rear wall may be adjusted to match the height of the trailer. Other more specific advantages and features of the invention will become apparent from the description which follows.

BRIEF DESCRIPTION OF THE DRAWINGS

FIG. 2D is a sectional view similar to FIG. 2C which illustrates a flexible transition panel connected to both the truck cab and to the sleeper apparatus;

DESCRIPTION OF THE PREFERRED EMBODIMENTS

Sleeper apparatus in accordance with the invention is especially adapted for use on tractor-trailer trucks and the like, and will be described in that context. However, as will be appreciated, this is illustrative of only one utility of the invention, and the invention may be readily adapted for use on other types of trucks.

Figure 1:
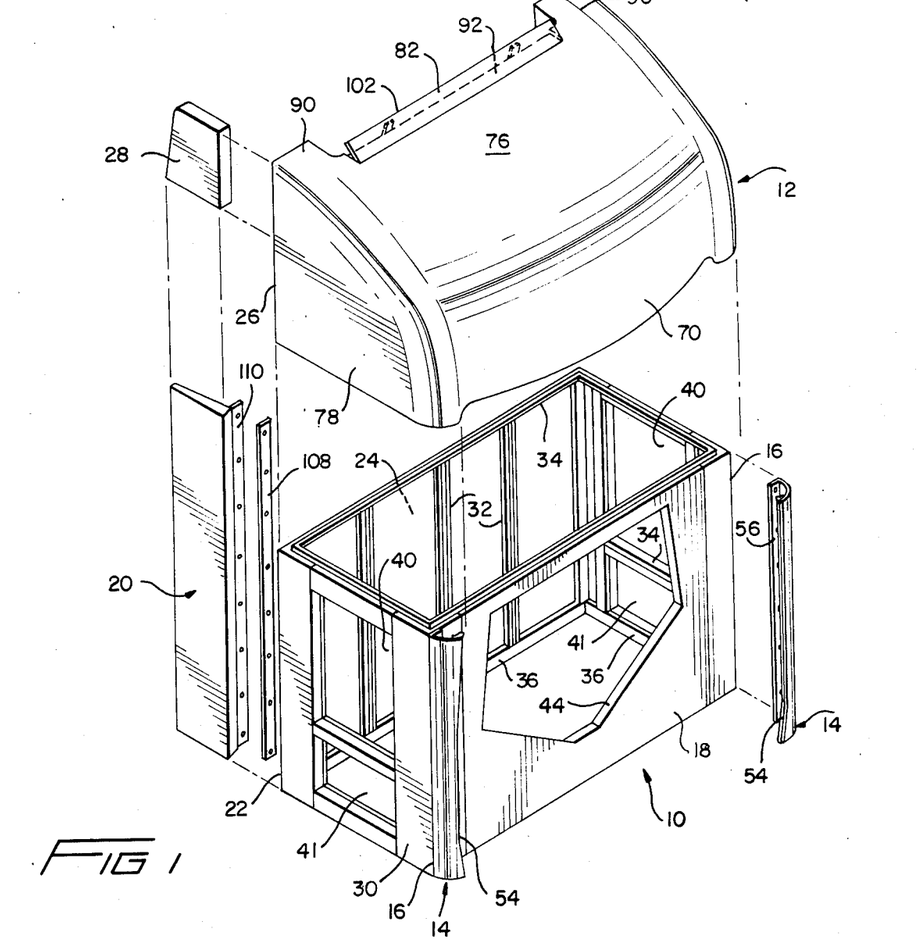
FIG. 1 is an exploded perspective view of sleeper apparatus in accordance with the invention.

FIG. 1 is an exploded perspective view of a preferred form of a sleeper apparatus in accordance with the invention. As shown, and as will be described in more detail shortly, the sleeper apparatus may comprise a sleeper base compartment or unit 10, a contoured top 12 adapted to be mounted on the sleeper base unit, a pair of transition panels 14 mounted along the side edges 16 of the front wall 18 of the sleeper base unit, a pair of adjustable side fairings 20 (only one being shown in the figure) mounted along the trailing side edges 22 of the rear wall 24 of the sleeper base unit and along a portion of the rear side edges 26 of top 12, and a pair of top trim pieces 28 (only one being shown in the figure) mounted along the remaining portion of the side edges 26 of the top above the adjustable side fairings. The leading edges 16 of the sleeper base unit and the trailing edges 22 and 26 of the base unit and top are preferably sharp corners, as opposed to rounded corners, for reasons to be explained later.

As illustrated in the figure, sleeper base unit 10 may comprise an upper framework, preferably of aluminum, formed of a plurality of vertical members 32 and horizontal interconnecting members 34. The vertical members of the upper framework may be connected to a lower base frame 36, which may be formed of steel. The upper framework may be covered with outer panels of any suitable material as sheet aluminum, steel, or fiberglass to form the walls such as front wall 18, rear wall 24, and sidewalls 30 of the sleeper base unit. Either one or both sides of the sleeper base unit may have openings 40 and 41 therein for receiving access doors 42 and 43, respectively, as shown in FIG. 2B. Front wall 18 of the sleeper base unit may have an opening 44 therein such as the trapezoidal-shaped opening illustrated in FIG. 1 to afford access to the sleeper base unit from the rear wall of the cab 46 of the truck on which the sleeper apparatus is used. Conventionally, a flexible rubber boot (not illustrated) extends between opening 44 of the sleeper unit and a correspdonding opening in the rear wall of the truck cab for providing an air and water tight passageway between the cab and the sleeper unit. The sleeper unit may be mounted on the truck frame (chassis) 48 behind the cab by brackets 50, as shown in FIG. 2B.

Figure 3:
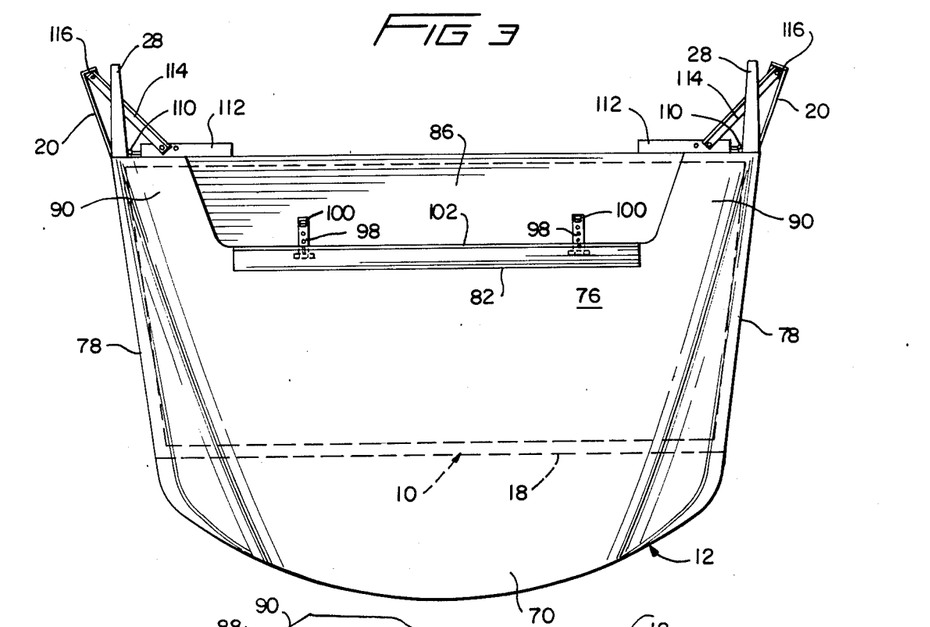
FIG. 3 is a top view of the sleeper apparatus of FIG. 1.

As best illustrated in FIG. 3, the sleeper base unit 10 has a smaller width (transverse or lateral dimension relative to the truck) at its front wall 18 than at its rear wall 24, and sides 30 which connect the front wall to the rear wall are vertical and taper laterally outwardly to the rear. This imparts to the sleeper base unit a front-to-back wedge shape, as shown. Preferably, the dimensions of front wall 18 are selected so that the width of the sleeper unit at its front wall is approximately equal to or slightly larger than the width of a standard truck cab, and the dimensions of rear wall 24 are preferably selected such that the width of the sleeper unit at its rear wall is approximately equal to the width of a standard trailer, e.g., 96 inches. The wedge shape of the sleeper unit is important from an aerodynamic standpoint. the front-to-back outward taper has the advantage of enabling the sleeper unit to be more closely matched to the truck cab and to the trailer, and sides 30 of the sleeper unit form, in effect, large side fairings which promote a smoother attached air flow between the size of the truck cab and the sides of the trailer. This increases aerodynamic efficiency, and may result in a substantial improvement in fuel economy. Moreover, the angled sides afford a closer fit between the front of the sleeper and the truck cab.

Figure 2A:
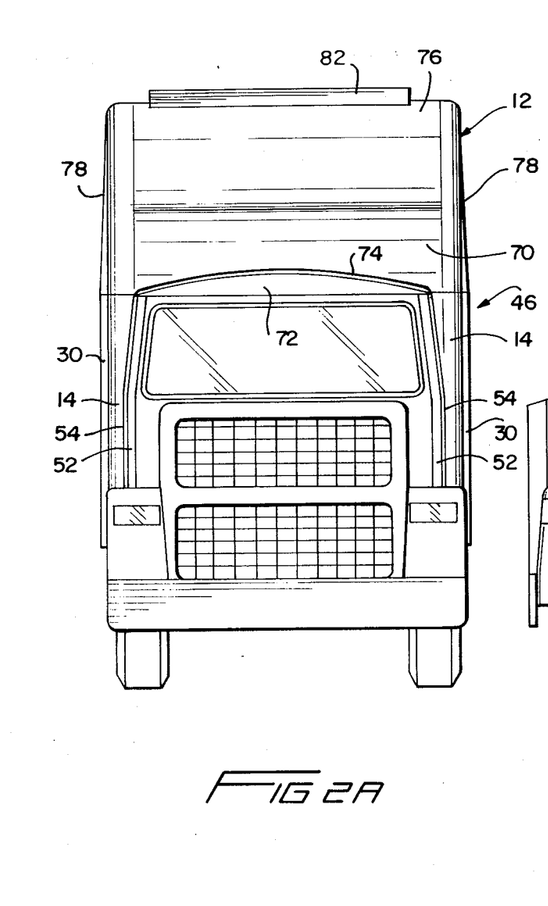
FIGS. 2A and B are, respectively, a front view and a side view showing sleeper apparatus in accordance with the invention installed on a truck.
Figure 2B:
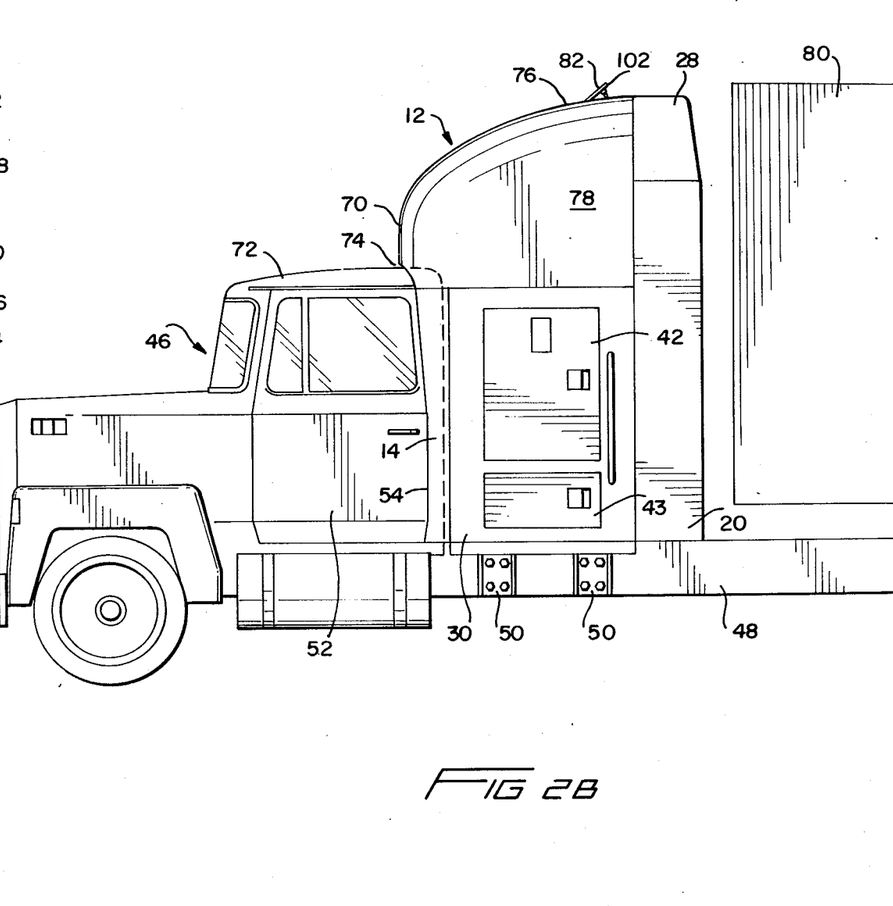
Figure 2C:
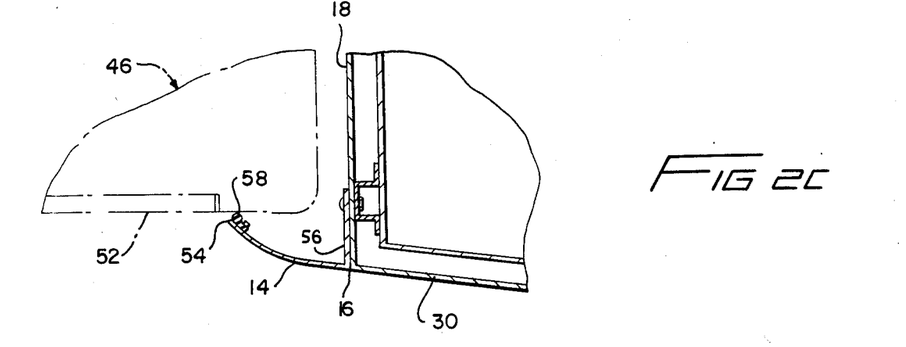
FIG. 2C is an enlarged partial sectional view of a portion of a sleeper apparatus which illustrates a free floating transition panel.

As shown in FIGS. 1 and 2A-C, transition panels 14 may comprise contoured panels which are shaped to provide a smooth transition between sides 30 of the sleeper unit and sides 52 of the truck cab. The leading vertical edges 54 of the transition panels are preferably configured to match the belt line, i.e., shape, of the sides of the truck cab so that the transition panels blend with the cab sides, as best illustrated in FIGS. 2A-B. The transition panels may comprise rigid members, as of moulded fiberglass, formed with a flange 56 to enable the panels to be bolted or otherwise attached to the front wall 18 of the sleeper unit at edges 16, as shown in FIG. 2C. The leading edge 54 the transition panels is preferably free floating at sides 52 of the truck cab. A resilient P-shaped bumper member 58, as of 60 durometer Neoprene rubber, may be attached to the inner surface of the panel adjacent to edge 54 for engagement with the sides of the cab. This arrangement enables limited relative movement between the sleeper unit and the truck cab occasioned by the inevitable twisting and bending of the truck frame during travel. If the transition panels were rigidly attached to the truck cab, this twisting and bending could crack or damage the transition panels. The free floating arrangement of the transition panel allows some give or flex and, therefore, prevents damage to the panel. Alternatively, the transition panel could be formed of flexible material, such as plastic, urethane, rubber, etc. and rigidly attached to both the sleeper unit and to the truck cab as shown in FIG. 2D.

Although the transition panels are not essential, they have the significant advantage of enabling the sleeper unit sides to be blended to the sides of the truck cab, which affords a smoother air flow between the truck cab and the sleeper unit and enables aerodynamic efficiency to be optimized. Moreover, the transition panels enable a standard sized sleeper unit to be matched to different classes and makes of truck by merely using a different transition panel having a contour which is appropriately matched to that of the truck on which the sleeper unit is installed. In addition, the transition panels give the sleeper units the appearance of being built-in or integral with the truck cab, while retaining the advantage of the sleeper unit being removable and reusable on other trucks, and the transition panels give the sleepers an appealing aesthetic appearance.

Figures 5, 7:
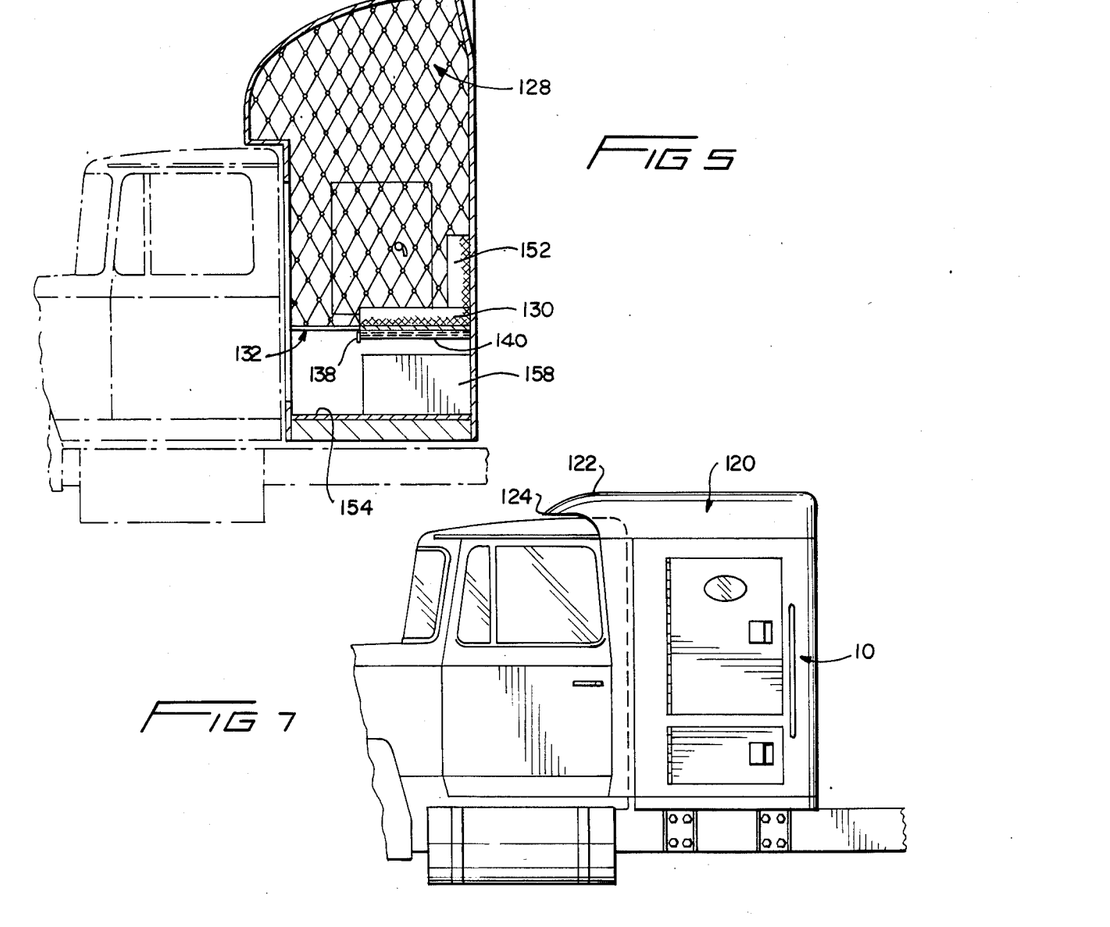
FIG. 5 is a side interior view of the sleeper apparatus.
FIG. 7 is a side view illustrating another form of sleeper apparatus in accordance with the invention.

As shown in the figures, top 12 of the sleeper apparatus may comprise a hollow contoured rigid shell, as of reinforced fiberglass, which is attached to the top of the sleeper base unit 10. The shell is preferably enclosed, except that the interior of the shell is open, as best illustrated in FIG. 5, to the interior of the sleeper base unit. This provides sufficient head room to enable an operator to stand easily within the sleeper apparatus, while making the sleeper apparatus roomy and affording overhead storage space. The shell is aerodynamically contoured so that the entire top constitutes an air fairing, as will be described.

The front 70 of the top is formed to overhang the roof 72 of the truck cab, e.g., by eighteen inches or so, and to be spaced slightly from the truck cab, as shown at 74 in FIG. 2B. This spacing, which may be of the order of one one-half inches, affords clearance between the overhanging portion and the cab roof to allow for limited relative movement between the sleeper apparatus and the truck cab during travel. Air vents (not illustrated) may be disposed in the overhanging portion adjacent to the cab roof.

As shown in the figures, the top may be formed to have a rounded front shape somewhat like that of a bullet. The leading front surface 70 of the top may extend upwardly substantially vertically from the cab roof and then curve smoothly rearwardly until it becomes substantially flat, i.e., substantially horizontal, adjacent to its rear, as shown at 76. The lower edges of sides 78 of the top are formed to mate with sides 30 of the sleeper unit and with transition panels 14 to provide a smoothly contoured upward continuation of the surfaces. The height of the top at its rear is preferably selected in accordance with the height of the sleeper unit such that the upper rear surface 76 of the sleeper top is at approximately the height of a standard trailer 80, e.g., 13 feet, as illustrated in FIG. 2B. In order to accommodate variations in trailer heights, an adjustable height tab 82 (to be described more fully shortly) may be positioned on the upper rear surface 76 of the top.

Figure 4:
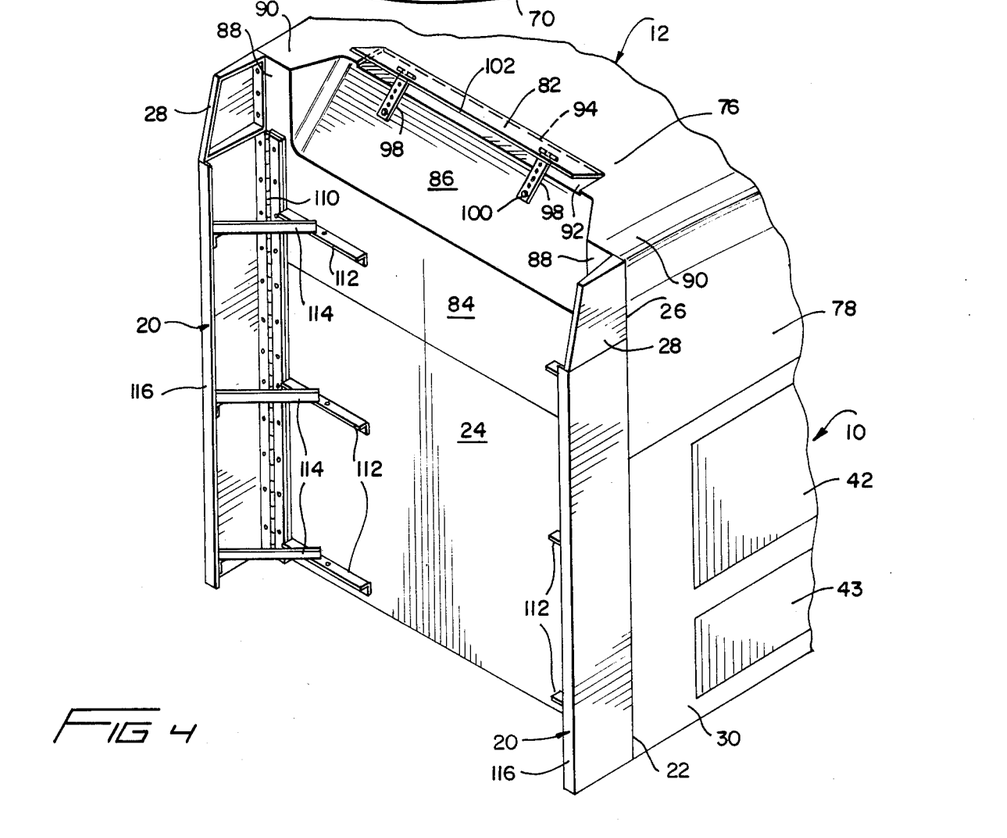
FIG. 4 is a rear perspective view of the sleeper apparatus.

As best illustrated in FIGS. 3 and 4, the rear wall 84 of the top may extend upwardly substantially vertically from the rear wall 24 of the sleeper unit, and may have an upper central portion of the rear wall 84 contoured upwardly and toward the front of the top to form a reverse cutout 86. The reverse cutout is advantageous for affording clearance between the upper edges of trailer 80 and the top during certain turning and dipping motions of the tractor-trailer, and also aids in directing the air flow up and over the top to lessen wind resistance when the tractor (without the trailer) is being towed or otherwise moved backwardly. The upper portions 88 of the rear wall of the top on opposite sides of the reverse cutout 86 preferably lie in substantially the same plane as the lower portion of rear wall 84 and continue upwardly to join the upper surface 76 of the top to form a pair of rearwardly directed fins 90. This affords a substantially continuous straight surface along the rear edges 22 of the sleeper unit and 26 of the top to which the adjustable side fairings 20 and top trim pieces 28 are attached.

As shown in FIG. 4, adjustable height tab 82 may comprise an elongated substantially rectangular panel which is disposed in a correspondingly shaped depression 92 in the upper surface 76 of the top. The height tab 82 may be connected to the top within depression 92 by a hinge 94 along a forward longitudinal edge of the panel, and a pair of height adjusting members 98 may be hinged to the underside of the panel and provided with a plurality of apertures for receiving a bolt 100 or other suitable fastener for connecting the members to the reverse cutout portion 86 of the top. This arrangement enables the height tab to be adjusted and rigidly fixed at a preset position, i.e., angle, so that the level of the rer longitudinal edge 102 of the height tab may be adjusted to accommodate different trailer heights.

The configuration of top 12 with its rounded contour, cab overhanging front portion, and shaped sides to match the sides of the sleeper unit is aerodynamically very efficient and affords what is referred to in the wind tunnel field as an attached air flow. Such an air flow optimizes fuel efficiency by reducing the coefficient of drag. The top conveys the air flow smoothly from the cab over the top of and around the sides of trailer 80. The front overhang of the top is significant in optimizing aerodynamic performance in that it permits air slicing to commence earlier and provides a greater surface length between the front and back of the top to allow the top to flatten out at its upper rear surface. This enables the air flow to be conveyed smoothly over the top. In addition, the overhang gives the sleeper apparatus in overall integral appearance, and it serves as a shield for the rubber connection boot between opening 44 of the sleeper unit and the cab to protect the boot from harmful ultraviolet sunrays.

The adjustable side fairings 20 and top trim pieces 28 serve as rearward extensions of the surfaces of the sleeper base unit and sleeper top to afford a smooth air flow from the sides of the sleeper apparatus to the sides of the trailer. As best illustrated in FIGS. 1, 3 and 4, the adjustable side fairings may comprise vertically oriented panels, as of sheet metal, which are hingedly connected to the rear wall 24 of the sleeper base unit and rear wall 84 of the sleeper top by piano-type hinges 110. A spacer strip 108 may be located between the hinge and the rear wall to enable the panels to pivot outwardly. The hinges enable the angle which the side fairings make with the sleeper to be varied, as shown, for example, in FIG. 3, to match the width of different trailers up to a width of 102 inches, for example. Angle-type brackets 112 may be positioned on the rear walls of the sleeper base unit and top, and brace members 114 may be pivotally connected to the side fairings at their rear edge 116 and connected to brackets 112 to fix the positions of the side fairings at a desired angle. In the form illustrated in the figures, the positions of the top trim pieces 28, are fixed relative to the top 90 of the sleeper rear wall 84, as shown. However, the trim pieces may be eliminated and the side fairings may be extended upwardly to the top of the sleeper to afford a side fairing which is adjustable throughout its entire height. The side fairings and the top trim pieces continue the smooth curvature of the sides of the sleeper base unit and the top rearwardly to convey the air flow smoothly to the sides of the trailer.

An advantage of the sleeper apparatus of the invention is that the same sleeper base unit 10 may be employed with different sleeper tops so as to enable the sleeper apparatus to be employed conveniently on different types of trucks. This is illustrated in FIG. 7 where a low profile top 120 is shown installed on sleeper base unit 10. As with top 12, sleeper top 120 has a front cab overhanging portion 122, and the front portion is spaced from the cab roof, as shown at 124. The low profile top is useful, for example, with flat bed trailers. As shown, the adjustable side fairings and top trim pieces may be omitted. Also, the use of different tops, as well as different transition panels, and the ability to match the sleeper to different sized trailers with the adjustable side fairings and top trim tab enables standardization of the sleeper base units, thereby reducing their cost.

Figure 6:
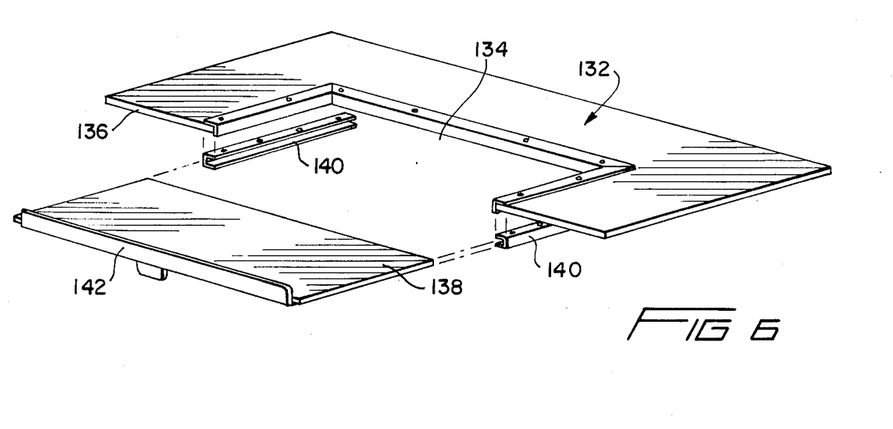
FIG. 6 is an exploded perspective view of a bunk supporting member of the sleeper apparatus.

As previously mentioned, an advantage of the rounded contour of sleeper top 12 is that its interior is hollow and it provides greater head room and storage space within the sleeper apparatus. As illustrated in FIG. 5, the interior walls of the sleeper base unit and top may be provided with an attractive surface covering, such as padding 128, which provides insulation and reduces the noise level within the sleeper apparatus. In order to enable an operator to stand easily within the sleeper, the bunk 130 of the sleeper may be supported on a horizontal support panel 132 which, as shown in FIG. 6, may have a central U-shaped cutout portion 134 which extends inwardly from the front longitudinal edge 136 of the panel. A sliding tray 138 sized to extend across the cutout may be supported at the underside of the panel in U-shaped guide channels 140, as shown, to enable the tray to be slid forwardly so that its front edge 142 coincides with edge 136, or to be slid rearwardly beneath panel 132 to open cutout 134.

The bunk mattress, which is supported by panel 132, is preferably formed in two pieces. One piece, 130, may be shaped similarly to panel 132 and provided with a similar U-shaped cutout. A second piece 152 of the mattress may be sized to fit within the cutout of the first portion of the mattress and to be supported on sliding tray 138 to form a sleeping bunk. When the sleeper is not in use, portion 152 of the mattress may be removed from the tray and placed against the back wall of the sleeper, as illustrated in FIG. 5, and tray 138 may be slid rearwardly as shown. The U-shaped cutout so formed provides a convenient space which allows an operator to enter the sleeper easily and stand on floor 154. The portion 152 of the mattress which was removed and placed against the rear wall of the sleeper conveniently serves as a back cushion to convert the bunk into a couch. For sleeping, it is simply necessary to slide tray 138 forwardly to enable the tray to support portion 152 of the mattress. A storage container or other convenience item 158 may be located beneath the bunk, as shown. The construction of the bunk supporting plate 132 with its sliding tray and the mattress affords a good deal of flexibility in that it enables the sleeper apparatus to serve both as a comfortable sleeping unit and to be easily converted into a comfortable seating area.

While preferred embodiments of the invention have been shown and described, it will be appreciated by those skilled in the art that changes may be made in these embodiments without departing from the principles and spirit of the invention, the scope of which is defined in the appended claims.

I claim:

1. Sleeper apparatus adapted to be removably disposed on a truck chassis behind the truck cab comprising a sleeper base compartment; a sleeper top installed on the base compartment, the sleeper base compartment comprising an enclosure having front, side and rear walls, the front wall having a smaller width than the rear wall and the side walls being extended outwardly to the rear to impart a front-to-back wedge shape to said enclosure; and the top comprising a rigid hollow shell which is aerodynamically contoured so as to impart to the top an aerodynamically efficient shape which reduces wind resistance and drag, the top having a height such that it extends above the height of the cab roof, and having a front portion which extends forwardly of the front wall of the enclosure so as to overhang the cab roof and to be free floating with respect to the cab roof, the front portion having a bottom wall which connects to the front wall to enclose the sleeper top, the entire bottom wall being spaced from the cab roof by an air space so as to permit air flow over the cab roof between the bottom wall and the cab roof; and vertically extending rigid transition panels connected to the front wall of the enclosure at opposite sides thereof, the transition panels extending from the sides of the enclosure to corresponding sides of the truck cab and having a leading vertical edge shaped to match the shape of the sides of the truck cab so that the transition panels blend into the sides of the truck cab, the leading edge being free floating at and spaced from the sides of the truck cab, and the transition panels being smoothly curved from the sides of the enclosure to the sides of the truck cab for smoothing air flow from the sides of the truck cab to the sides of the enclosure.

2. The sleeper apparatus of claim 1, wherein the width of the front wall of the enclosure is approximately equal to the width of the truck cab, and the rear wall of the enclosure has a predetermined wider width which is approximately equal to the width of a trailer adapted to be connected to said truck.

3. The apparatus of claim 1, wherein the leading edges of the transition panels have resilient bumper members connected thereto for engagement with the sides of the truck cab.

4. The apparatus of claim 1, wherein said sleeper top has an upper surface which curves smoothly rearwardly from said front overhanging portion to a rear wall of the sleeper top, the rear wall of the sleeper top being in substantially the same plane as the rear wall of said enclosure, and wherein a rear portion of said upper surface adjacent to the rear wall of the top flattens out to become substantially horizontal so for smoothly conveying air flowing rearwardly over the upper surface of the top.

5. The apparatus of claim 4, wherein the rear wall of the sleeper top has a height such that the height of the rear portion of the upper surface of the sleeper top is at approximately the same height as said trailer.

6. The apparatus of claim 5 further comprising a laterally extending tab member positioned on the rear portion of said upper surface adjacent to the rear wall of the top, the tab member being hinged to the upper surface along a forward edge of the tab member so as to enable the angular position of the tab member relative to the upper surface to be varied, and wherein adjusting means is included for fixing the tab member at a predetermined angular position at which the height of a trailing lateral edge of the tab member matches the height of said trailer.

7. The apparatus of claim 6, wherein said tab member is positioned in a correspondingly shaped depression in said upper surface, and wherein the adjusting means comprises a bracket member pivotally connected to the tab member adjacent its trailing lateral edge, and means for connecting the bracket member to the rear wall of the sleeper top.

8. The apparatus of claim 1 further comprising adjustable side fairings attached to the rear walls of said enclosure and said top adjacent to opposite sides thereof for smoothing air flowing rearwardly past such sides.

9. The apparatus of claim 2, wherein said front and rear walls join said side walls at sharp corners.

10. The apparatus of claim 1, wherein said sleeper base compartment and said sleeper top are configured to smooth the flow of air thereover.

11. The apparatus of claim 1, wherein the interior of said sleeper base compartment is open to the interior of the hollow shell of said sleeper top to increase the interior space within said sleeper apparatus.

12. The apparatus of claim 1, further comprising a sleeping mattress supporting panel positioned within said sleeper base compartment, said panel having a centrally located cutout therein, a tray sized with respect to said cutout and being slidingly connected to said panel such that the tray is moveable to substantially close said cutout, and a mattress positioned on said panel, the mattress having a first portion shaped with another cutout to match the cutout in said panel, and having a removable portion sized to fit within the cutout of said mattress.

13. Sleeper apparatus adapted to be removably disposed on a truck chassis behind the truck cab comprising a sleeper base compartment, a sleeper top installed on the base compartment, the base compartment comprising an enclosure having front, side and rear walls, and the top comprising a rigid hollow shell which is aerodynamically contoured so as to form an air fairing, the top having a front portion which extends forwardly of the front wall of the enclosure as to overhang the cab roof and to be free floating with respect to the cab roof, the front portion having a bottom wall which connects to the front wall to enclose the sleeper top, the entire bottom wall being spaced from the cab roof by an air space so as to permit air flow over the cab roof between the bottom wall and the cab roof, and vertically extending transition panels connected to the front wall of the enclosure adjacent to the side walls of the enclosure, the transition panels extending from the sides of the enclosure to corresponding sides of the truck cab and having a leading edge shaped to match the shape of the sides of the truck cab so that the transition panels blend into the sides of the truck cab, the leading edge being free floating at and spaced from the sides of the truck cab, and the transition panels being smoothly curved from the sides of the truck cab to the sides of the enclosure for smoothing air flow from the sides of the truck cab to the sides of the enclosure.

14. The apparatus of claim 13 further comprising a laterally extending adjustable height tab pivotally connected to an upper surface of the sleeper top adjacent to a rear wall thereof so as to enable the adjustable height tab to be angled upwardly and rearwardly relative to said upper surface, and means for holding the adjustable height tab at a predetermined angle with respect to said upper surface.

15. Sleeper apparatus adapted to be removably disposed on a truck chassis behind the truck cab comprising a sleeper base compartment, the base compartment comprising an enclosure having front, side and rear walls, the front wall having a smaller width than the rear wall and the side walls being extended outwardly to the rear to impart a front-to-back wedge shape to said enclosure; a sleeper top installed on the base compartment, the top comprising a rigid hollow shell which is aerodynamically contoured so as to impart to the top an aerodynamically efficient shape which reduces wind resistance and drag, the top having a height such that it extends above the height of the cab roof, and having a front portion which extends forwardly of the front wall of the enclosure so as to overhang the cab roof and to be free floating with respect to the cab roof, the front portion having a bottom wall which connects to the front wall to enclose the sleeper top, the entire bottom wall being spaced from the cab roof by an air space so as to permit air flow over the cab roof between the bottom wall and the cab roof; vertically extending flexible transition panels connected to the front wall at opposite sides thereof, the transition panels extending from the sides of the enclosure to corresponding sides of the truck cab and having a leading edge shaped to match the shape of the sides of the truck cab so that the transition panels blend into the sides of the truck cab, the leading edges of the transition panels being connected to the sides of the truck cab and the transition panels being smoothly curved from the sides of the truck cab to the sides of the enclosure for smoothing air flowing thereover.

16. Sleeper apparatus adapted to be removably disposed on a truck chassis behind the truck cab comprising a sleeper base compartment, the base compartment comprising an enclosure having front, side and rear walls, the front wall having a smaller width than the rear wall and the side walls being extended outwardly to the rear to impart a front-to-back wedge shape to the enclosure; and a sleeper top installed on the base compartment, the top comprising a rigid hollow shell which is aerodynamically contoured as to impart to the top an aerodynamically efficient shape which reduces wind resistance and drag, the top having a height such that it extends above the height of the cab roof, and having a front portion which extends forwardly of the front wall of the enclosure so as to overhang the cab roof and to be spaced therefrom, the sleeper top further having an upper surface which curves smoothly rearwardly from said front portion to a rear wall of the sleeper top, the rear wall of the sleeper top being in substantially the same plane as the rear wall of said enclosure, a rear portion of said upper surface adjacent to the rear wall of the top flattening out to become substantially horizontal for smoothly conveying air flowing rearwardly over the upper surface, and an upper central portion of the rear wall of said top being angled forwardly to form a reverse cutout for facilitating air impinging on said rear wall to flow over said upper surface upon the truck cab being moved in a reverse direction.

17. Sleeper apparatus adapted to be removably disposed on a truck chassis behind the truck cab comprising a sleeper base compartment; a sleeper top installed in the base compartment; the base compartment comprising an enclosure having front, side and rear walls, and the top comprising a rigid hollow shell which is aerodynamically contoured so as to form an air fairing, the top having a front portion which extends forwardly of the front wall of the enclosure so as to overhang the cab roof and to be free floating with respect to the cab roof, the front portion having a bottom wall which connects to the front wall to enclose the sleeper top, the entire bottom wall being spaced from the cab roof by an air space so as to permit air flow over the cab roof between the bottom wall and the cab roof; transition panels connected to the front wall of the enclosure adjacent to the side walls of the enclosure, the transition panels extending forwardly from the sides of the enclosure to corresponding sides of the truck cab and having a leading edge shaped to match the shape of the sides of the truck cab so that the transition panels blend into the sides of the truck cab; adjustable side fairings comprising vertically oriented side panels pivotally connected to the rear wall of the enclosure adjacent to the side walls so as to enable the side panels to be positioned at an angle relative to the side walls; and means connected to the side panels and to the rear wall for fixing the positions of the side panels at predetermined angles relative to the side walls.

18. The apparatus of claim 17, wherein said means for fixing comprises brackets mounted on the rear wall and brace members pivotally connected to said side panels adjacent said rear edges and to said brackets to fix the positions of said side panels at a predetermined angle.

* * * * *

UNITED STATES PATENT AND TRADEMARK OFFICE
CERTIFICATE OF CORRECTION

PATENT NO. : 4,775,179

DATED : October 4, 1988

INVENTOR(S) : RIGGS

It is certified that error appears in the above-identified patent and that said Letters Patent is hereby corrected as shown below:

Column 8, line 68 (Claim 4, line 9) delete "so".

Signed and Sealed this

Eleventh Day of July, 1989

Attest:

DONALD J. QUIGG

*Attesting Officer*  *Commissioner of Patents and Trademarks*